US008961318B2

(12) United States Patent
Liber et al.

(10) Patent No.: US 8,961,318 B2
(45) Date of Patent: *Feb. 24, 2015

(54) SHARING RESOURCES IN WAGERING GAME SYSTEMS

(71) Applicant: WMS Gaming, Inc., Waukegan, IL (US)

(72) Inventors: Nevin J. Liber, Libertyville, IL (US); Scott H. Schulhof, Chicago, IL (US); Jason A. Smith, Vernon Hills, IL (US); Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/708,629

(22) Filed: Dec. 7, 2012

(65) Prior Publication Data

US 2013/0095930 A1 Apr. 18, 2013

Related U.S. Application Data

(63) Continuation of application No. 12/811,652, filed as application No. PCT/US2009/030062 on Jan. 3, 2009, now Pat. No. 8,353,774.

(60) Provisional application No. 61/019,032, filed on Jan. 4, 2008.

(51) Int. Cl.
*A63F 13/12* (2006.01)
*G07F 17/32* (2006.01)

(52) U.S. Cl.
CPC ............ *G07F 17/3227* (2013.01); *G07F 17/32* (2013.01); *G07F 17/3202* (2013.01); *G07F 17/3218* (2013.01); *G07F 17/3223* (2013.01); *G07F 17/3234* (2013.01)
USPC .............................................. 463/42; 463/25

(58) Field of Classification Search
USPC ...................................................... 463/42, 25
See application file for complete search history.

(56) References Cited

U.S. PATENT DOCUMENTS 5,999,808 A 12/1999 LaDue
2004/0248646 A1 12/2004 Canterbury (Continued)

FOREIGN PATENT DOCUMENTS

JP 2007-527258 A 9/2007
JP 2007-527286 A 9/2007
WO WO-2009089124 7/2009

OTHER PUBLICATIONS

"PCT Application No. PCT/US09/30062 International Preliminary Report on Patentability", Jan. 27, 2010 , 11 pages.

(Continued)

*Primary Examiner* — Pierre E Elisca
(74) *Attorney, Agent, or Firm* — DeLizio Gilliam, PLLC

(57) ABSTRACT

Techniques for sharing resources in wagering game systems are described herein. Some embodiments include a method comprising: detecting, by the wagering game machine, low processing capabilities of the wagering game machine. The method can include determining, based on the detecting low processing capabilities, that remote resources are needed for processing video content associated with a wagering game. The method can include requesting, via a network, the remote resources from the remote wagering game machine. The method can also include receiving, from the remote wagering game machine via the network, processed video content for the wagering game, and presenting, on a display device, the wagering game using the processed video content.

20 Claims, 10 Drawing Sheets

(56) References Cited

U.S. PATENT DOCUMENTS

| | | | | |
|---|---|---|---|---|
| 2006/0259957 | A1 | 11/2006 | Tam et al. | |
| 2007/0066395 | A1 | 3/2007 | Harris et al. | |
| 2007/0136817 | A1* | 6/2007 | Nguyen | 726/26 |
| 2007/0191109 | A1 | 8/2007 | Crowder et al. | |
| 2007/0198656 | A1 | 8/2007 | Mazzaferri et al. | |
| 2007/0243934 | A1 | 10/2007 | Little | |
| 2007/0293323 | A1 | 12/2007 | Gatto et al. | |
| 2008/0268959 | A1* | 10/2008 | Bryson et al. | 463/42 |
| 2010/0169222 | A1* | 7/2010 | Qawami et al. | 705/59 |
| 2010/0197385 | A1* | 8/2010 | Aoki et al. | 463/27 |
| 2010/0248815 | A1* | 9/2010 | Radek | 463/25 |
| 2010/0298054 | A1 | 11/2010 | Liber et al. | |
| 2011/0086699 | A1* | 4/2011 | Allen et al. | 463/25 |
| 2011/0111864 | A1* | 5/2011 | Englman et al. | 463/42 |
| 2011/0183749 | A1* | 7/2011 | Allen et al. | 463/25 |
| 2011/0287828 | A1* | 11/2011 | Anderson et al. | 463/25 |
| 2012/0202587 | A1* | 8/2012 | Allen et al. | 463/25 |
| 2013/0310163 | A1* | 11/2013 | Smith et al. | 463/26 |

OTHER PUBLICATIONS

"PCT Application No. PCT/US09/30062 International Search Report", Feb. 26, 2009 , 10 pages.

"U.S. Appl. No. 12/811,652 Office Action", Mar. 14, 2012 , 9 pages.

* cited by examiner

SHARING RESOURCES IN WAGERING GAME SYSTEMS

RELATED APPLICATIONS

This application claims the priority to, and is a continuation application of, U.S. application Ser. No. 12/811,652 filed on Jul. 2, 2010. The Ser. No. 12/811,652 application claims priority benefit of PCT Application No. PCT/US09/30062, filed on Jan. 3, 2009, which claims the priority benefit of U.S. Provisional Application No. 60/019,032 filed Jan. 4, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to sharing resources among wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Techniques for sharing computation resources among wagering game systems are described herein. This description of the embodiments is divided into four main sections. The first section introduces some embodiments of the invention, while the second section describes example wagering game machine architectures. The third section describes example operations performed by some embodiments and the fourth section presents some general comments.

Introduction

Players are becoming increasingly mobile within the casino/hotel environment and desiring more convenience in their gaming experiences. Mobile wagering game machines ("mobile machines") are designed to be carried in various casino areas (e.g., special pool areas). This can result in situations where mobile machines lack resources to execute wagering games. For example, a mobile machine operating near a hotel swimming pool may lack battery life necessary for processing certain video content. In other situations, a mobile machine or stationary cabinet-style wagering game machine ("stationary machines") may require additional resources despite being in a traditional casino area. For example, a stationary machine may not have free storage space to store game history for more wagering games.

According to some embodiments of the invention, wagering game machines can share resources across wired and wireless communication links. Resources can include storage space, processing capabilities, increased display capabilities, etc. The following sections describe embodiments in greater detail.

Operating Environment

This section describes an example operating environment and presents structural aspects of some embodiments. This section includes discussion about wagering game networks, wagering game machine architectures, and wagering game server architecture.

Wagering Game Networks

Figure 1:
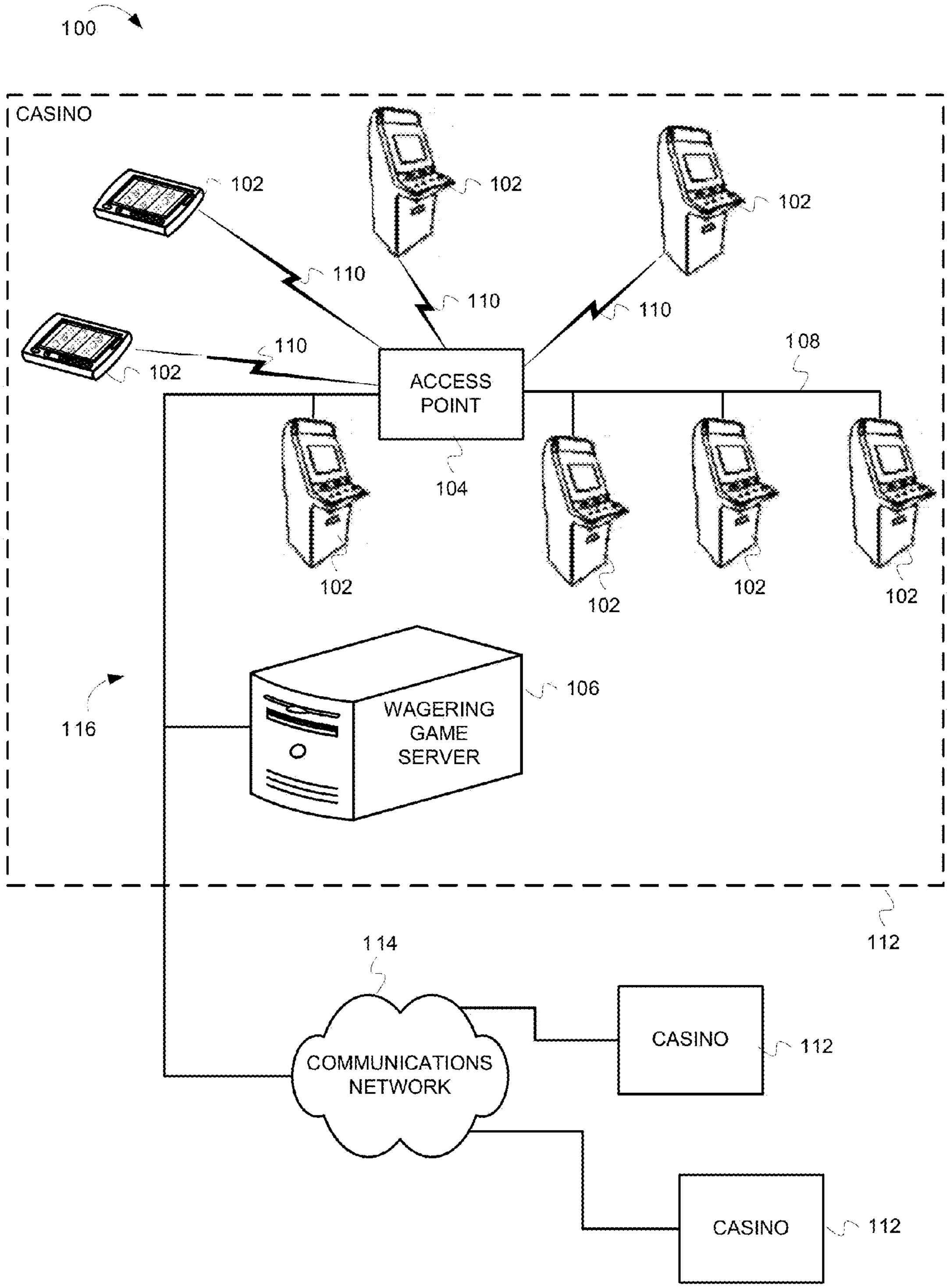
FIG. 1 is a block diagram illustrating a wagering game network in which the components can share resources and content, according to example embodiments of the invention.

FIG. 1 is a block diagram illustrating a wagering game network in which the components can share resources and content, according to example embodiments of the invention. As shown in FIG. 1, the wagering game network 100 includes a communications network 114 connected to a plurality of casinos 112. Each casino 112 includes a local area network 116, which includes a access point 104, a wagering game server c 106, and wagering game machines 102.

The access point 104 facilitates communications and resource sharing over wireless communication links 110 and wired communication links 108. The wired and wireless communication links 108 & 110 can employ any suitable connection technology, such as Bluetooth, 802.11g, Ethernet, public switched telephone networks, SONET, etc.

The wagering game server 106 can facilitate resource and content sharing among wagering game machines. Additionally, the wagering game server 106 can host wagering games, electronically fund wagering games, deposit winnings, transfer monies, etc. In some embodiments, the wagering game server 106 verifies player login credentials before allowing devices to play wagering games.

The wagering game machines 102 described herein can take any suitable form, such as stationary models, mobile models, bar top models, workstation-type console models, etc. Further, the wagering game machines 102 can be primarily dedicated for use in conducting wagering games, or can include non-dedicated devices, such as mobile phones, personal digital assistants, personal computers, etc.

In some embodiments, wagering game machines 102 utilize the local area network 116, communications network 114, and/or other communication facilities to share content and resources. As previously described, resources include storage space, processing capabilities, increased display capabilities, etc. Content can include audio/video content, game history information, game result information, etc.

In some embodiments, wagering game machines 102 and wagering game servers 106 work together such that a wagering game machine 102 can be operated as a thin, thick, or intermediate client. For example, one or more elements of game play may be controlled by the wagering game machine 102 (client) or the wagering game server 106 (server). Game play elements can include executable game code, lookup tables, configuration files, game outcome, audio or visual representations of the game, game assets or the like. In a thin-client example, the wagering game server 106 can perform functions such as determining game outcome or managing assets, while the wagering game machine 102 can present a graphical representation of such outcome or asset modification to the user (e.g., player). In a thick-client example, the wagering game machines 102 can determine game outcomes and communicate the outcomes to the wagering game server 106 for recording or managing a player's account.

In some embodiments, either the wagering game machines 102 (client) or the wagering game server 106 can provide functionality that is not directly related to game play. For example, account transactions and account rules may be managed centrally (e.g., by the wagering game server 106) or locally (e.g., by the wagering game machine 102). Other functionality not directly related to game play may include power management, presentation of advertising, software or firmware updates, system quality or security checks, etc. While the wagering game network 100 includes a single server, it can also include other servers that provide the functionality described herein and other functionality.

Any of the wagering game network components (e.g., the wagering game machines 102) can include hardware and machine-readable media including instructions for performing the operations described herein. The wagering game network 100 can also include other network devices, such as wide area progressive servers, wagering game maintenance servers, etc.

Wagering Game Network Servers

Figure 2:
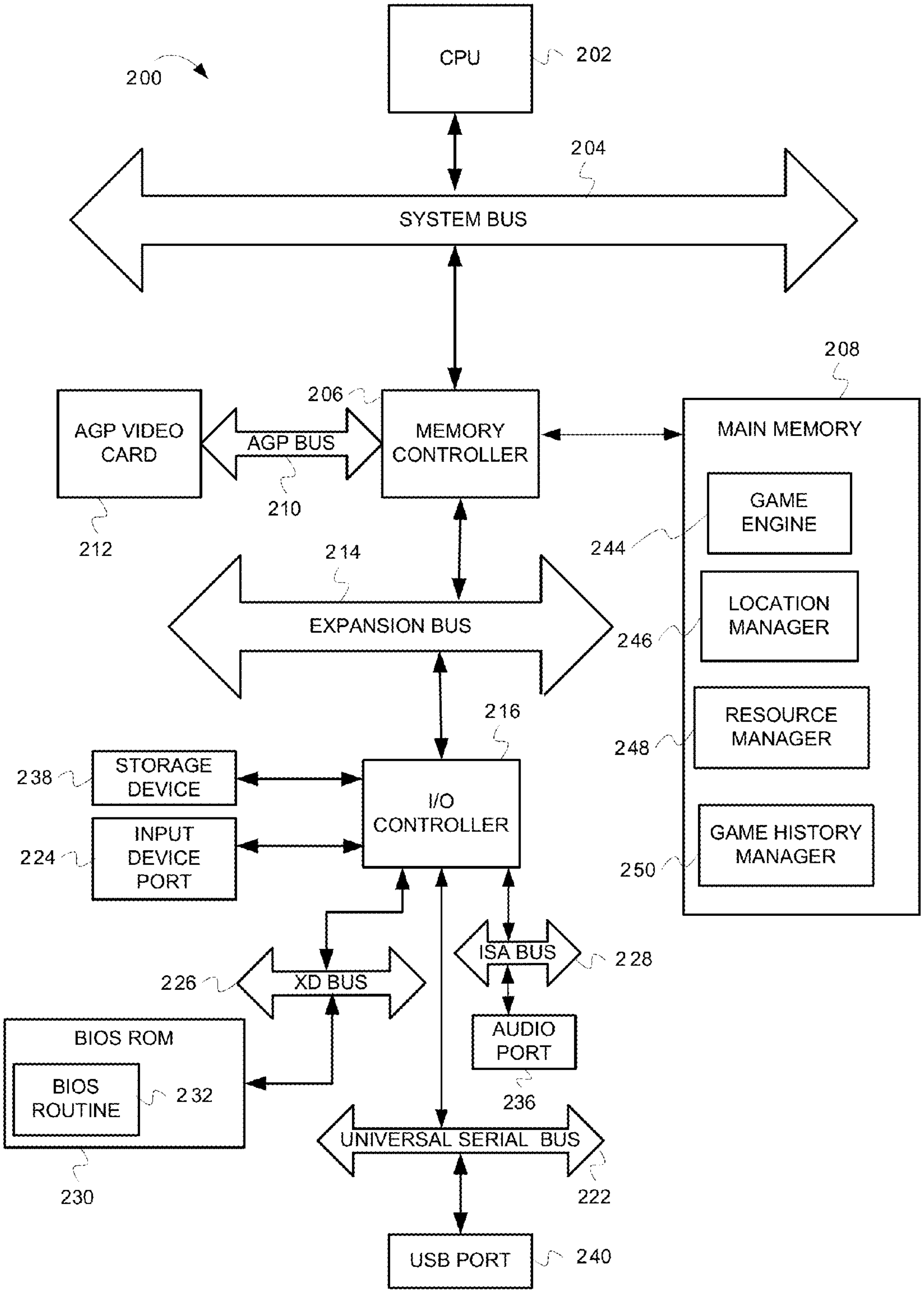
FIG. 2 is a block diagram illustrating a wagering game server, according to some embodiments of the invention.

FIG. 2 is a block diagram illustrating a wagering game server, according to some embodiments of the invention. In FIG. 2, a wagering game server ("game server") 200 includes a central processing unit 202 connected to a system bus 204. The system bus 204 is connected to a memory controller 206 (also called a north bridge), which is connected to a main memory 208, AGP bus 210, and AGP video card 212. The main memory 208 can include any suitable memory random access memory (RAM), such as synchronous dynamic RAM, extended data output RAM, etc.

The main memory 208 includes a game engine 244, a location manager 246, a resource manager 248, and a game history manager 250. The game engine 244 can process events from the wagering game machines. For example, in response to events indicating game play, the game engine 244 can transmit game results and/or content to wagering game machines.

The location manager 246 can locate mobile machines in relation to other wagering game machines and devices. By locating devices, the location manager can facilitate resource and content sharing. In some embodiments, the location manager 246 includes a global positioning system (GPS) transmitter that can determine the wagering game machine's location using GPS satellites. In other embodiments, the location manager 246 can include a radio frequency identification (RFID) tag that can determine the wagering game machine's location using RFID readers positioned throughout a casino.

The resource manager 248 can determine what resources are available in a pool of devices. Additionally, the resource manager 248 can allocate resources from the pool. In some embodiments, the resource manager 248 allocates resources by instructing devices to share particular resources, such as storage space, processing power, processing functionality (e.g., video codecs), etc.

An expansion bus 214 connects the memory controller 206 to an input/output (I/O) controller 216 (also called a south bridge). According to embodiments, the expansion bus 214 can be include a peripheral component interconnect (PCI) bus, PCIX bus, PC Card bus, CardBus bus, InfiniBand bus, or an industry standard architecture (ISA) bus, etc. The I/O controller is connected to input device ports 224 (e.g., keyboard port, mouse port, etc.), storage device 238 (e.g., hard disk drive), and a universal serial bus (USB) 222. The USB 222 is connected to a USB port 240. The I/O controller 216 is also connected to an XD bus 226 and an ISA bus 228. The ISA bus 228 is connected to an audio device port 236, while the XD bus 226 is connected to BIOS read only memory (ROM) 230.

In some embodiments, the game server 200 can include additional peripheral devices and/or more than one of each component shown in FIG. 2. For example, in some embodiments, the game server 200 can include multiple CPUs 202.

Wagering Game Machines

Figure 3:
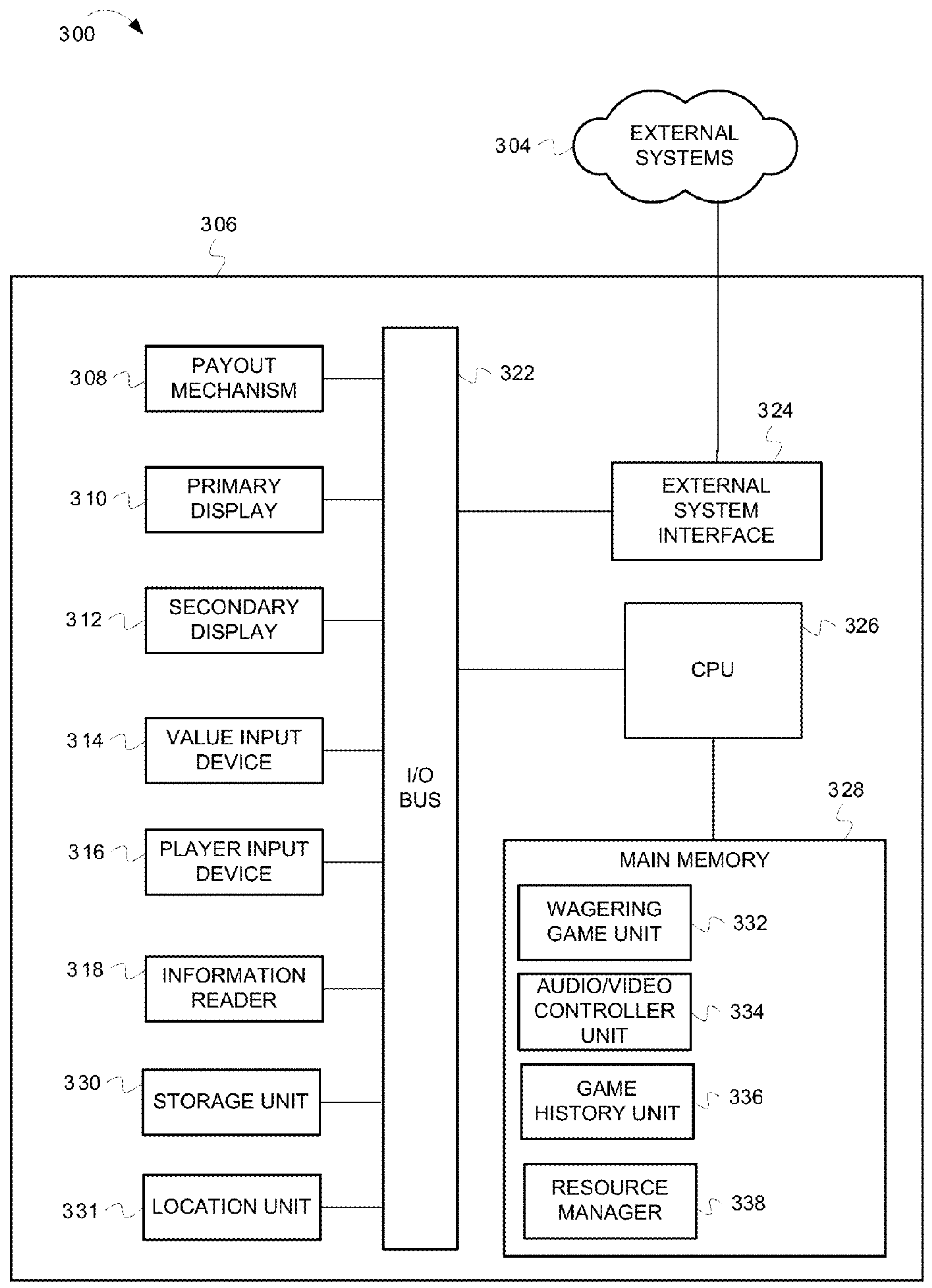
FIG. 3 is a block diagram illustrating a wagering game machine capable of utilizing resources of other devices, according to some embodiments of the invention.

FIG. 3 is a block diagram illustrating a wagering game machine capable of utilizing resources of other devices, according to some embodiments of the invention. The wagering game machine 306 can be implemented as stationary machines, mobile machines, bar top models, workstation-type console models, or any other suitable model.

As shown in FIG. 3, the wagering game machine 306 includes a central processing unit (CPU) 326 connected to main memory 328. The CPU 326 can include any suitable processor, such as an Intel® Pentium processor, Intel® Core 2 Duo processor, AMD Opteron™ processor, or UltraSPARC processor. The main memory 328 includes a wagering game unit 332, an audio/video controller unit 334, a game history unit 336, and a resource manager 338. In some embodiments, the wagering game unit 332 can present wagering games, such as video poker, video black jack, video slots, video lottery, etc., in whole or part.

The audio/video controller 334 can benefit from processing performed by other devices of a wagering game network. While the audio/video controller 334 can present audio & video content without assistance from other network devices, it can also present audio & video content that has been processed by other devices (e.g., stationary machines). For example, the audio/video controller 334 can present video content that has been scaled-down for particular display devices.

The game history unit 336 can also share resources with other network devices. For example, it can transmit game history information to nearby wagering game machines, game servers, or other devices for storage. Storing game history information enables wagering game machines to make space for operations, such as presenting wagering games.

The CPU 326 is connected to an input/output (I/O) bus 322, which can include any suitable bus technologies, such as an AGTL+ frontside bus and a PCI backside bus. The I/O bus 322 is connected to a payout mechanism 308, primary display 310, secondary display 312, value input device 314, player input device 316, information reader 318, and storage unit 330. The player input device 316 can include the value input device 314 to the extent the player input device 316 is used to place wagers. The I/O bus 322 is also connected to an external system interface 324, which is connected to external systems 324 (e.g., wagering game networks).

The I/O bus 322 is also connected to a location unit 331. The location unit 331 can create information indicating the wagering game machine's location and movements in a casino. In some embodiments, network devices can use the location information to find the wagering game machine 306 and offer it resources, such as storage space, processing power, etc. In some embodiments, the location unit 331 includes a global positioning system (GPS) receiver that communicates with the game server's location manager 246 to determine the wagering game machine's location using GPS satellites. In other embodiments, the location unit 331 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 3, in some embodiments, the location unit 331 is not connected to the I/O bus 322.

In one embodiment, the wagering game machine 306 can include additional peripheral devices and/or more than one of each component shown in FIG. 3. For example, in one embodiment, the wagering game machine 306 can include multiple external system interfaces 324 and/or multiple CPUs 326.

Any of the components described herein can be further integrated or divided. Furthermore, any of the components can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments one or more of the operations can be performed in parallel. Moreover, some embodiments can perform less than all the operations shown in any flow diagram.

Resource Sharing and Content Processing

This subsection describes operations for sharing computation resources and content among devices of a wagering game network. In some embodiments, wagering game machines and game servers work together to share computation resources and process content.

As previously discussed, a wagering game machine (mobile machine, stationary machine, etc.) can share resources when another wagering game machine (mobile machine, stationary machine, etc.) is unable to perform certain tasks. For example, a mobile machine low on battery power or with limited processing capabilities may not be able to present certain wagering games. Sharing resources such as processing capabilities, storage space, display capabilities, etc. allows the mobile machine to extend its operating time and capabilities. Thus, resource sharing enables wagering game machines to present more wagering games.

Figure 4:
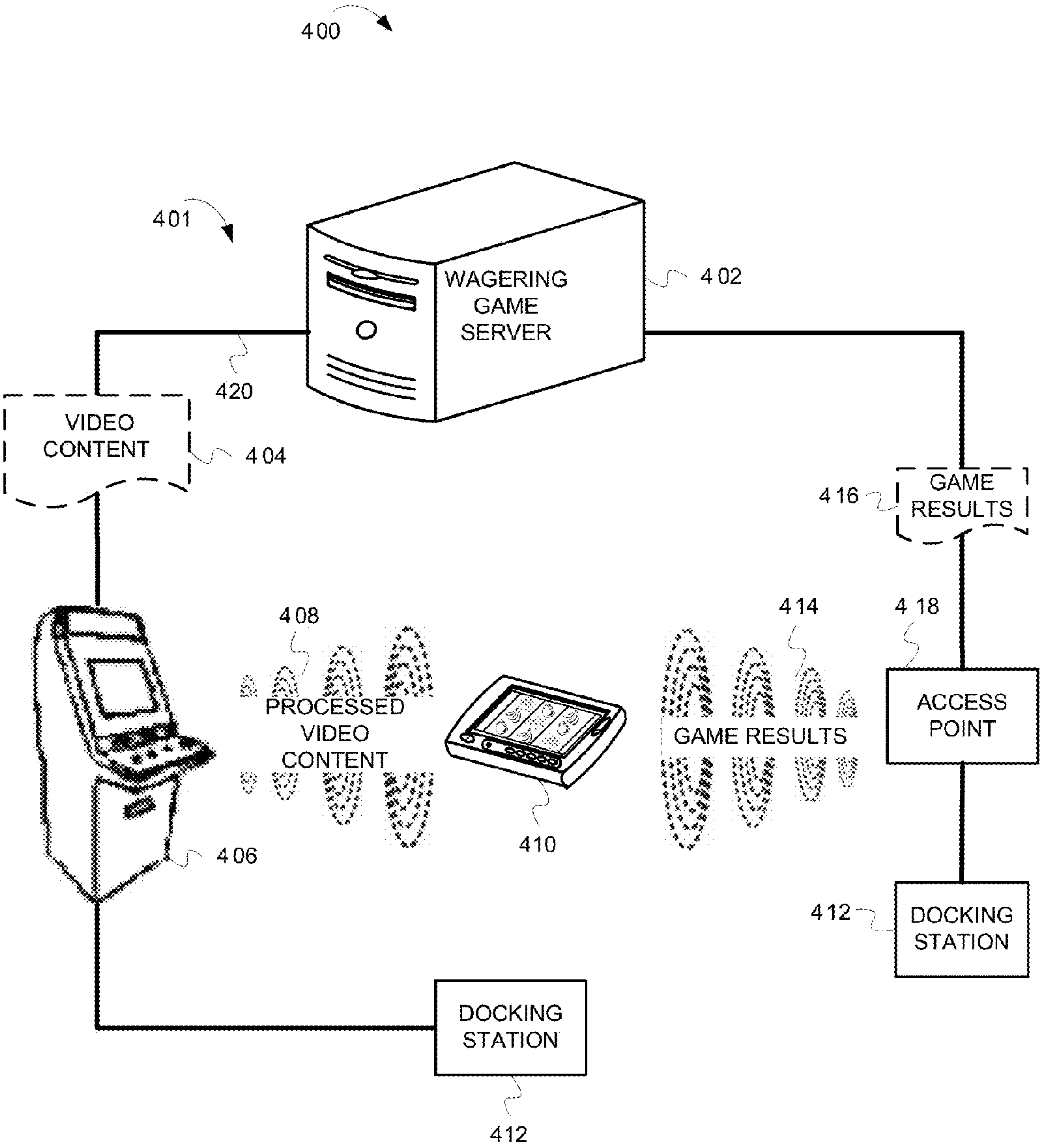
FIG. 4 illustrates a wagering game network in which devices can share resources, according to example embodiments of the invention.

In some embodiments, a mobile machine can receive resources (e.g., processed content) from other wagering game machines over wireless communication links. For example, a stationary machine can process video content and send the processed content to a mobile machine via a wireless link. As a result, the mobile machine can present the content even though it may lack certain resources (e.g., battery life, storage space, processing hardware/software, etc.). FIG. 4 explains this concept in more detail.

FIG. 4 illustrates a wagering game network in which devices can share resources, according to example embodiments of the invention. The resource sharing wagering game network 400 includes a game server 402, a stationary machine 406, a access point 418, a docking station 412, and a mobile machine 410. The access point 418 can transmit information to the network devices over a wireless communication link 414 and a wired communication link 420.

FIG. 4 shows a scenario in which the mobile machine 410 procures processing resources from a stationary machine 406. In some embodiments, the mobile machine 410 itself locates needed resources by attempting to wirelessly connect to nearby devices, such as the stationary machine 406. Upon connecting, the mobile machine 410 can request needed resources. In other embodiments, the mobile machine 410 asks the game server 402 (e.g., via the access point 418) to locate needed resources.

In order to process audio/video content for the mobile machine 410, the stationary machine 406 receives, via the wired link 420, video content 404 from the game server 402. The video content 404 can be in various formats (e.g., PNG, MNG, AVI, MPEG4, VOB, etc.) and it can be scaled for large display devices, such as those typically found in stationary machines. The stationary machine 406 can then process the video content 404 by scaling it down to a size suitable for the mobile machine's smaller display device. In some embodiments, the stationary machine reduces the resolution of the video content 404. In some embodiments, the stationary machine can reduce the color space (number of distinct colors used in the image) of the video content. In some embodiments, the stationary machine can increase or decrease the compression of the video content 404. Because the stationary machine 406 can utilize processing resources of the stationary machine 406, the mobile machine 410 can avoid expending battery power down-scaling the video content for its smaller display device.

The stationary machine 406 can transmit the processed video content to the mobile machine 410 via a wireless link 408 (e.g., via a direct Bluetooth® connection or via an 802.11 connections through the access point 418). In turn, the mobile machine 410 presents the processed video content without having to expend battery power and storage space necessary for down-scaling the content.

Mobile machines can also take advantage of resource sharing when connected to docking stations. In some embodiments, when plugged into the docking station 412, the mobile machine 410 can receive processed content via the wired communication link 420. As a result, the mobile machine 410 can share resources when roaming about a casino or when connected to a docking station 410.

This section continues with a discussion of operations for performing resource sharing, such as that shown in FIG. 4.

Figure 5:
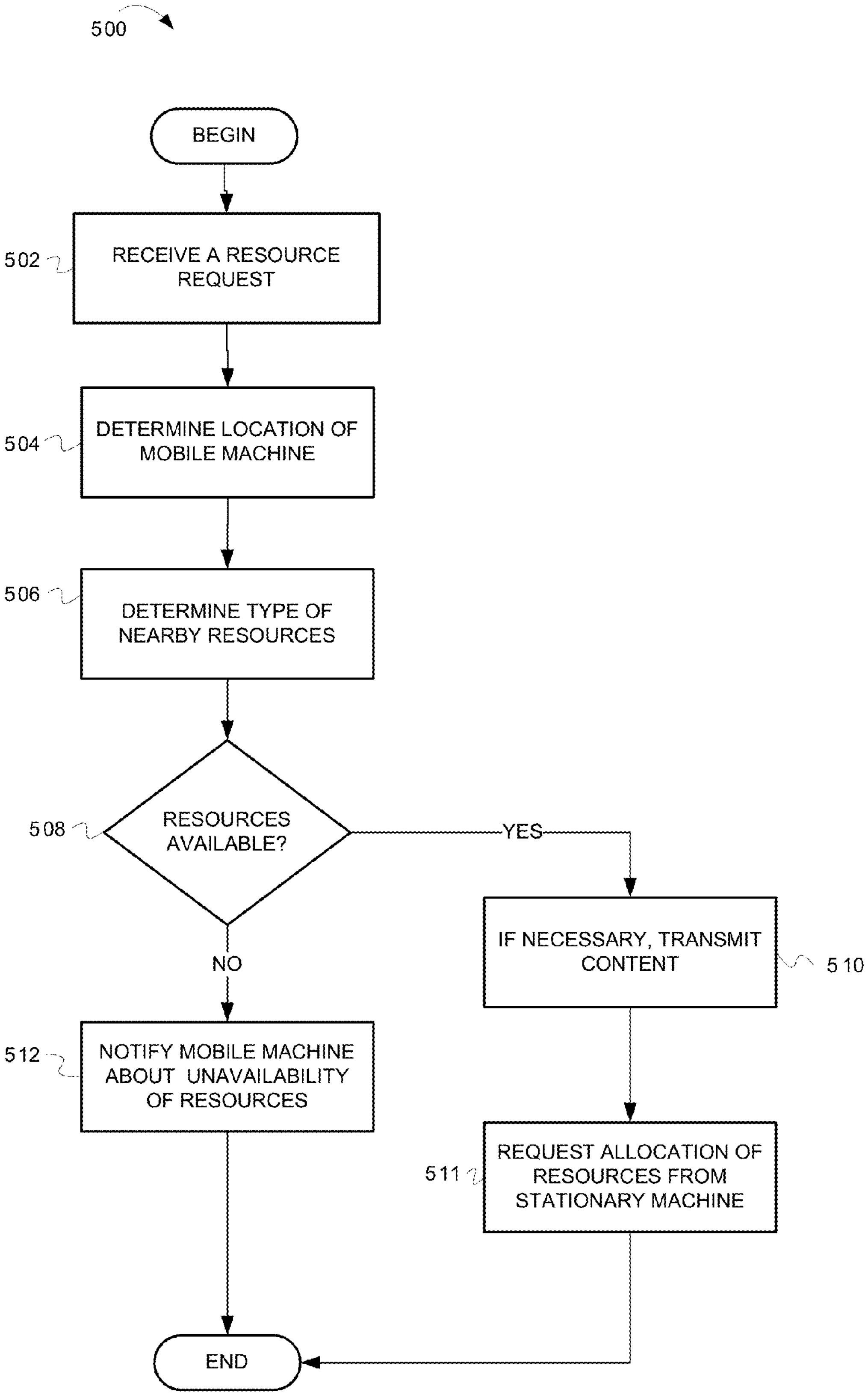
FIG. 5 is a flow diagram illustrating operations for allocating available resources between nearby wagering game machines, according to some embodiments of the invention.

FIG. 5 is a flow diagram illustrating operations for allocating available resources between nearby wagering game machines, according to some embodiments of the invention. The flow 500 begins at block 502.

At block 502, the game server's resource manager 248 receives a request for resources. The resource manager 248 may receive the request from a mobile machine needing graphics processing or other resources. The game server can assist the mobile machine by locating and sharing resources, such as graphics processing resources. The mobile machine's graphics processing power may be limited due to a number of factors, including low battery power, insufficient storage space, or limited internal memory space. The flow continues at block 504.

At block 504, the game server's location manager 246 determines the location of the mobile machine that sent the resource request. As previously discussed, the location manager 246 can include a global positioning components that determine the mobile machine's location using GPS satellites. The location manager 246 can also use radio frequency identification (RFID) tags and readers to locate the mobile machine. The flow continues at block 506.

At block 506, the game server's resource manager 248 determines the type of resources available in devices near the mobile machine. For example, the location manager 246 queries a pool of nearby wagering game machines to determine type and availability of their resources. The available resources can include content, storage space, processing capabilities, etc. Content can include game results, audio/video content, game history information, etc. In some embodiments, the nearby wagering game machines can share their resources by processing audio/video content for mobile machines, thereby enabling the mobile machines to conserve battery power, storage space, processing power, etc. The flow continues at block 508.

At block 508, the game server's resource manager 248 determines whether the requested resources are available in one or more network devices (e.g., one or more stationary machines). If the requested resources are available, the flow continues at block 510. Otherwise, the flow continues at block 512.

At block 510, the game server 200 transmits content to a stationary machine, if necessary. The game server 200 can supply audio/video content to one or more stationary machines that will process the content for a nearby mobile machine (for details about content processing, see discussion of FIG. 6). In some embodiments, the game server 200 supplies content to wagering game machines, where the content indicates game results and other game information. The flow continues at block 511.

At block 511, the game server's resource manager 248 requests that one or more nearby wagering game machines allocate resources to the mobile machine. For example, the resource manager 248 requests that a stationary machine process and deliver audio/video content to a mobile machine. The processing can include scaling the audio content for presentation on a particular display device residing in the mobile machine. Additionally, the processing can reduce video frame rate, number of audio channels, etc. From block 511, the flow ends.

At block 512, the game server's resource manager 248 notifies the mobile machine about the unavailability of resources. For example, the game server 200 can send a message to the mobile machine indicating there are no available resources. From block 512, the flow ends.

Although FIG. 5 shows how some game servers can assist wagering game machines with resource sharing, some wagering game machines can share resources without assistance from servers. This discussion continues with a description of how stationary machines can share resources by processing content for mobile machines.

Figure 6:
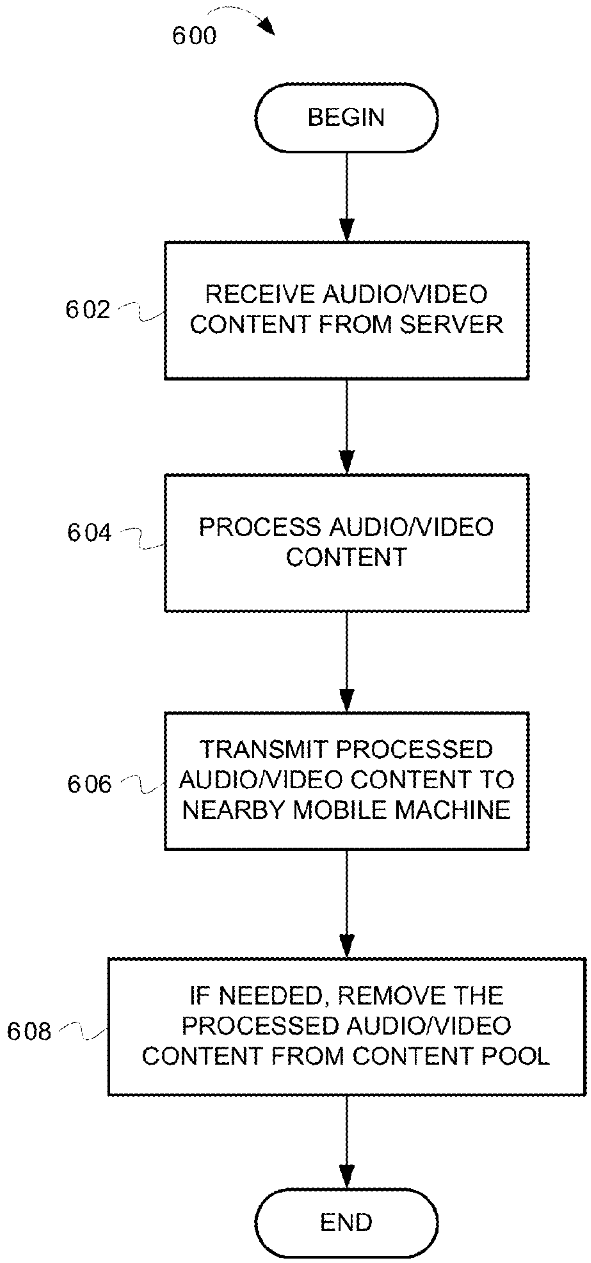
FIG. 6 is a flow diagram illustrating operations for processing and sharing audio/video content, according to some embodiments of the invention.

FIG. 6 is a flow diagram illustrating operations for processing and sharing audio/video content, according to some embodiments of the invention. The flow 600 begins at block 602.

At block 602, the stationary machine 406 receives audio/video content 404 from a wagering game server. The stationary machine can receive the audio/video content as part of a resource sharing method (see discussion of block 510) in which the stationary machine processes content for presentation by a mobile machine. The audio/video content can be in a variety of audio/video formats, including AVI, MPEG4, VOB, etc. In some embodiments, the stationary machine may already have the audio/video content, so it may not perform block 602. The flow continues at block 604.

At block 604, the stationary machine's audio/video controller 334 processes the audio/video content. In some embodiments, processing audio/video content includes reducing the scale, changing the format, reducing audio quality, etc. while retaining the content's integrity. The flow continues at block 606.

At block 606, the stationary machine's external system interface 324 transmits processed audio/video content to the mobile machine. The flow continues at block 608.

At block 608, the stationary machine's audio/video controller 334 removes the processed audio/video content from its content pool, if needed. In some embodiments, the stationary machine may need to free-up storage space after performing processing operations for the mobile machine. Removing processed content creates space for new content and other processing operations. From block 608, the flow ends.

This section continues with a description of how mobile machines can request and receive processed audio/video content.

Figure 7:
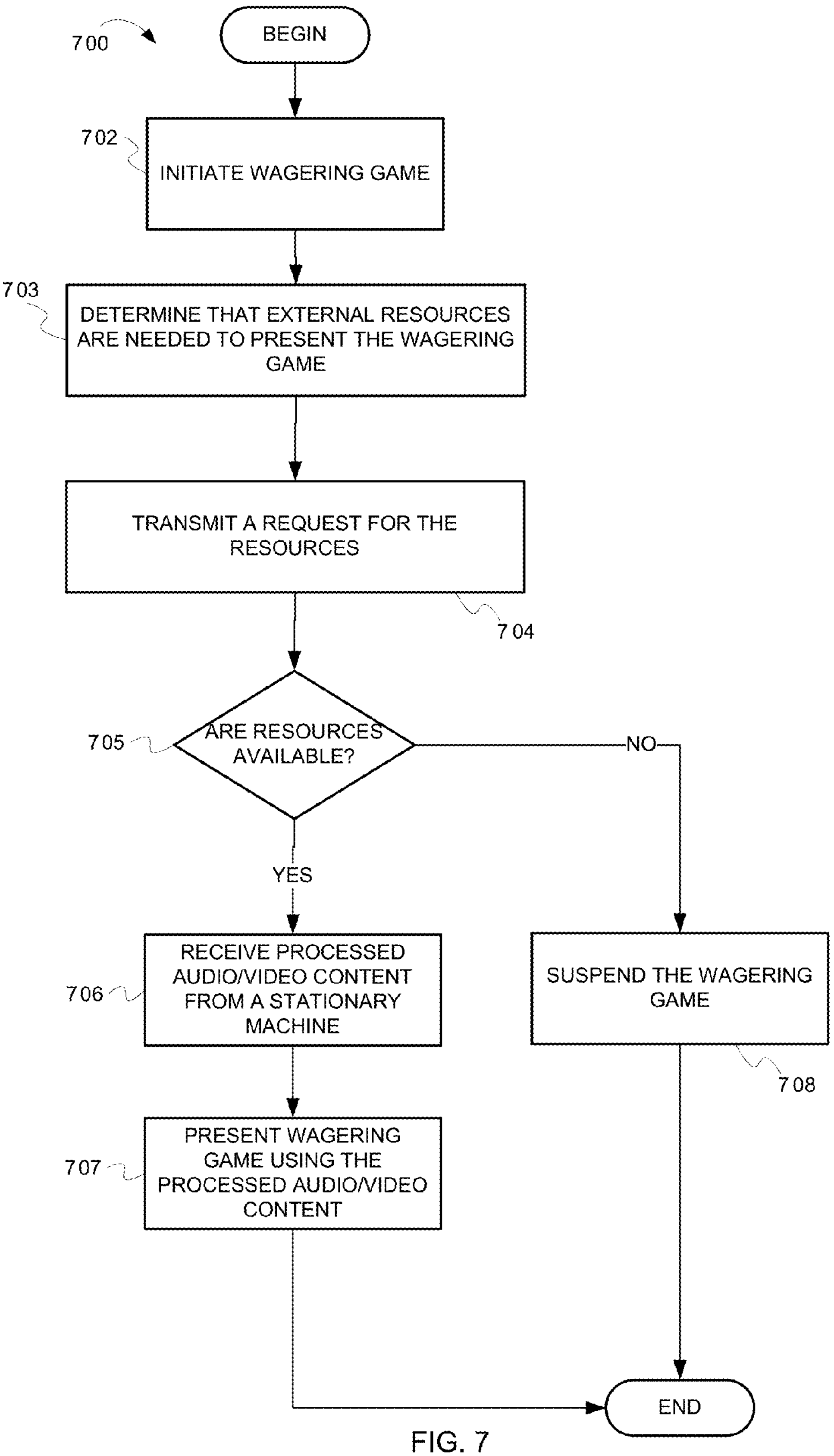
FIG. 7 is a flow diagram illustrating for receiving and presenting audio/video content processed by other network devices, according to some embodiments of the invention.

FIG. 7 is a flow diagram illustrating operations for receiving and presenting audio/video content processed by other network devices, according to some embodiments of the invention. The flow 700 begins at block 702.

At block 702, a mobile machine initiates a wagering game. For example, the mobile machine can detect player input requesting initiation of a wagering game. In response to the player input, the mobile machine can determine game results. Alternatively, the mobile machine can request and receive game results from a game server. The mobile machine can then prepare to present the game results using audio/video content. The flow continues at block 703.

At block 703, the mobile machine's resource manager 338 determines that external resources are needed to present the wagering game. For example, the mobile machine determines that it is lacking battery power, storage space, video processing software, or other resources needed to re-scale or otherwise process audio/video content for presentation on its display device.

At block 704, the mobile machine transmits a request for needed resources. For example, the mobile machine may request video content that has already been scaled for its display device. In some embodiments, the mobile machine transmits the request a game server, which assists in locating needed resources (see FIG. 5). In other embodiments, the mobile machine transmits requests directly to nearby devices (e.g., via Bluetooth, other RF signals, optical signals, etc.). The flow continues at block 705.

At block 705, the mobile machine's resource manager 338 determines whether the needed resources are available. If the needed resources are available, the resource manager 338 may receive a message indicating availability of the needed resources. For example, the mobile machine may receive, from a nearby stationary machine, a message indicating that processed audio/content (e.g., video content scaled for the mobile machine) is forthcoming. If such a message is received, the flow continues at block 706. Otherwise, the flow continues at block 708.

At block 706, the mobile machine's audio/video controller 334 receives processed audio/video content from a stationary machine. The audio/video content can be received directly from the stationary machine via wireless communications or via an access point. Although this example describes receiving processed audio/video content from a stationary machine, the mobile machine can receive the processed content from any suitable network device (i.e., any suitable device can process the audio/video content for the mobile machine). The flow continues at block 707.

At block 707, the mobile machine's audio/video controller 334 presents the wagering game using the processed audio/video content. The audio/video controller can present the content on the primary display 310, secondary display 312, and audio devices without expending battery power, storage space, and processing power re-scaling the content. From block 707, the flow ends.

At block 708, in the event that needed resources are not available, the mobile machine's wagering game unit 332 suspends the wagering game. In some embodiments, the wagering game unit 332 records information indicating the wagering game's state and shuts-down the mobile machine. From block 708, the flow ends.

In some embodiments, wagering game machines can prospectively request resources. For example, if a mobile machine predicts it will need a certain video file, the mobile machine can request that a stationary machine process the video file before the video file is needed. Later, the mobile machine can download the video file from the stationary machine just before it will present the video file.

Storing Game History

Figure 8:
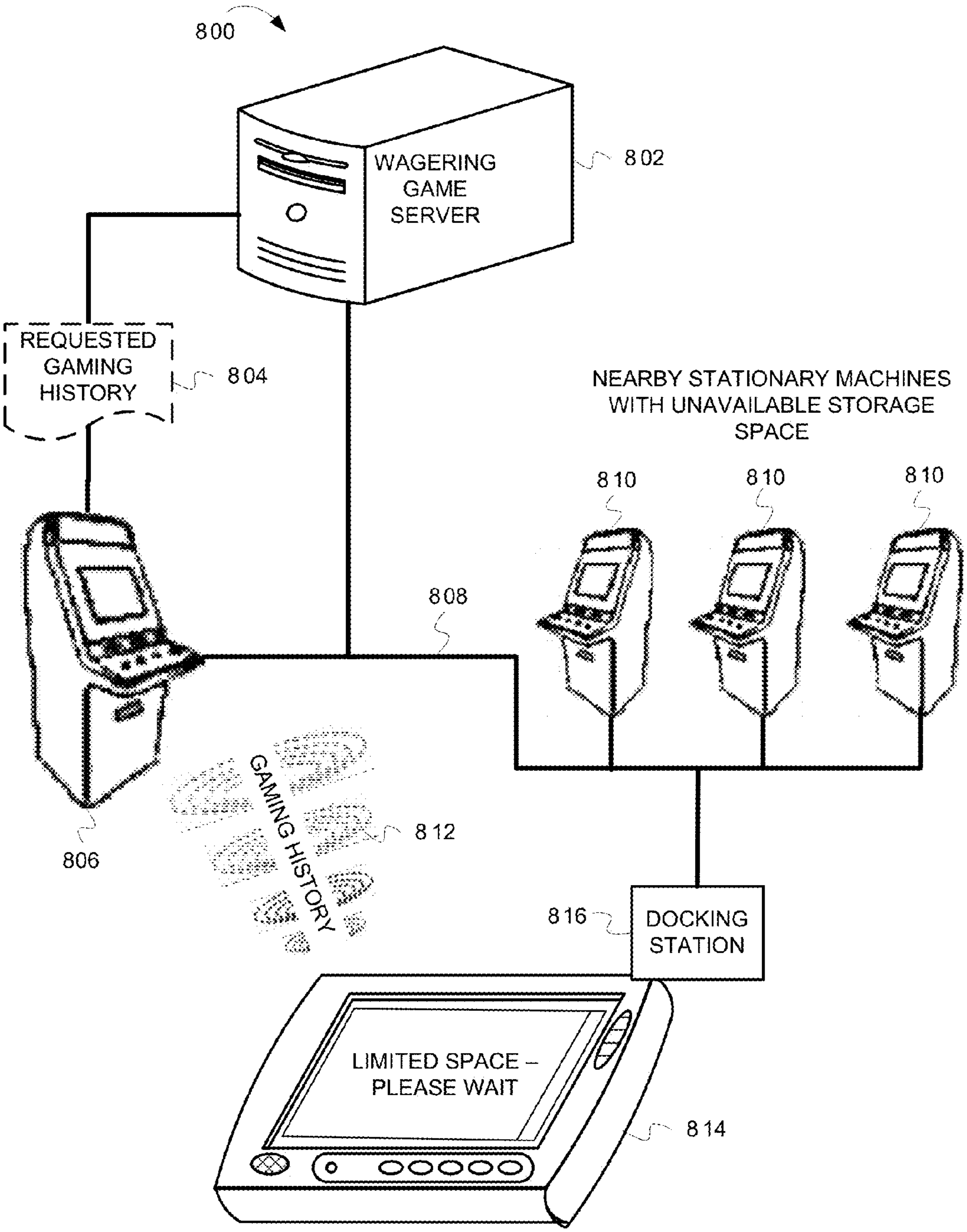
FIG. 8 illustrates a mobile machine storing game history on a nearby stationary machine, according to example embodiments of the invention.

As mentioned above, resource sharing can encompass a multitude of resources, such as processing, storage, functionality, etc. The following discussion of FIGS. 8-10 describes how a mobile machine's game history can be stored to a nearby stationary machine. FIG. 8 presents a conceptual illustration of a mobile machine storing game history on a nearby stationary machine, while FIGS. 9-10 describe the operations for storing game history on stationary machines. These operations free storage space on mobile machines, thus enabling the mobile machines to exhibit increased functionality and performance.

FIG. 8 illustrates a mobile machine storing game history on a nearby stationary machine, according to example embodiments of the invention. Game history includes information indicating button presses, bets, intermediate game results, final game results, etc. Casino attendants can use the game history to resolve disputes. For example, a casino attendant can put a mobile machine into a "replay" mode in which the mobile machine uses game history to replay a game and verify the game result. Also, in some jurisdictions, gaming regulators require wagering game machines to store game history.

The gaming network 800 includes a mobile machine 814, wagering game server 802, stationary machines 806, and docking station 816. In some embodiments, the mobile machine 814 requires more than its available storage space. In order to free-up the required storage space, the mobile machine 814 can transmit its game history to a nearby stationary machine 806. For example, in FIG. 8, following an attempt to execute content requiring more than its available storage space, the mobile machine 814 can search for nearby stationary machines that have available storage space for the mobile machine's game history. The mobile machine 814 can search by wirelessly transmitting storage requests to stationary machines within transmission range. If docked at the docking station 816, the mobile machine 814 can search by transmitting storage requests over the wired communication link 808. If there are delays associated with freeing the storage space, the mobile machine 814 can present a message notifying players of the delay.

When a nearby stationary machine with available storage space responds, the mobile machine 814 can transmit its game history content to the stationary machine. For example, the stationary machine 806 is in transmission range and has available storage space. Although other stationary machines (810) are also within range, they do not have available storage space. Thus, the mobile machine 814 transmits game history content via the wireless communication link 812 to stationary machine 806. In some embodiments, the stationary machine 806 can transmit game history content 804 to the wagering game server 802 if its internal storage becomes full. Although not shown, the wagering game server 802 can be connected to the network 800 via a wireless communications link (e.g. Bluetooth, 802.11g, etc.).

After storing the game history on the stationary machine 806, the mobile machine 814 may request the game history back from the stationary machine 806. For example, if a player dispute arises, the mobile machine 806 may require its game history to replay results of an earlier game.

Although storage space is one reason for resource sharing, embodiments are not limited to this reason. Other reasons for sharing resources include increasing battery life, increasing processing power, increasing functionality, etc. While FIG. 8 presents a conceptual view of space sharing, FIGS. 9 and 10 show operations for sharing space in wagering game networks.

Figure 9:
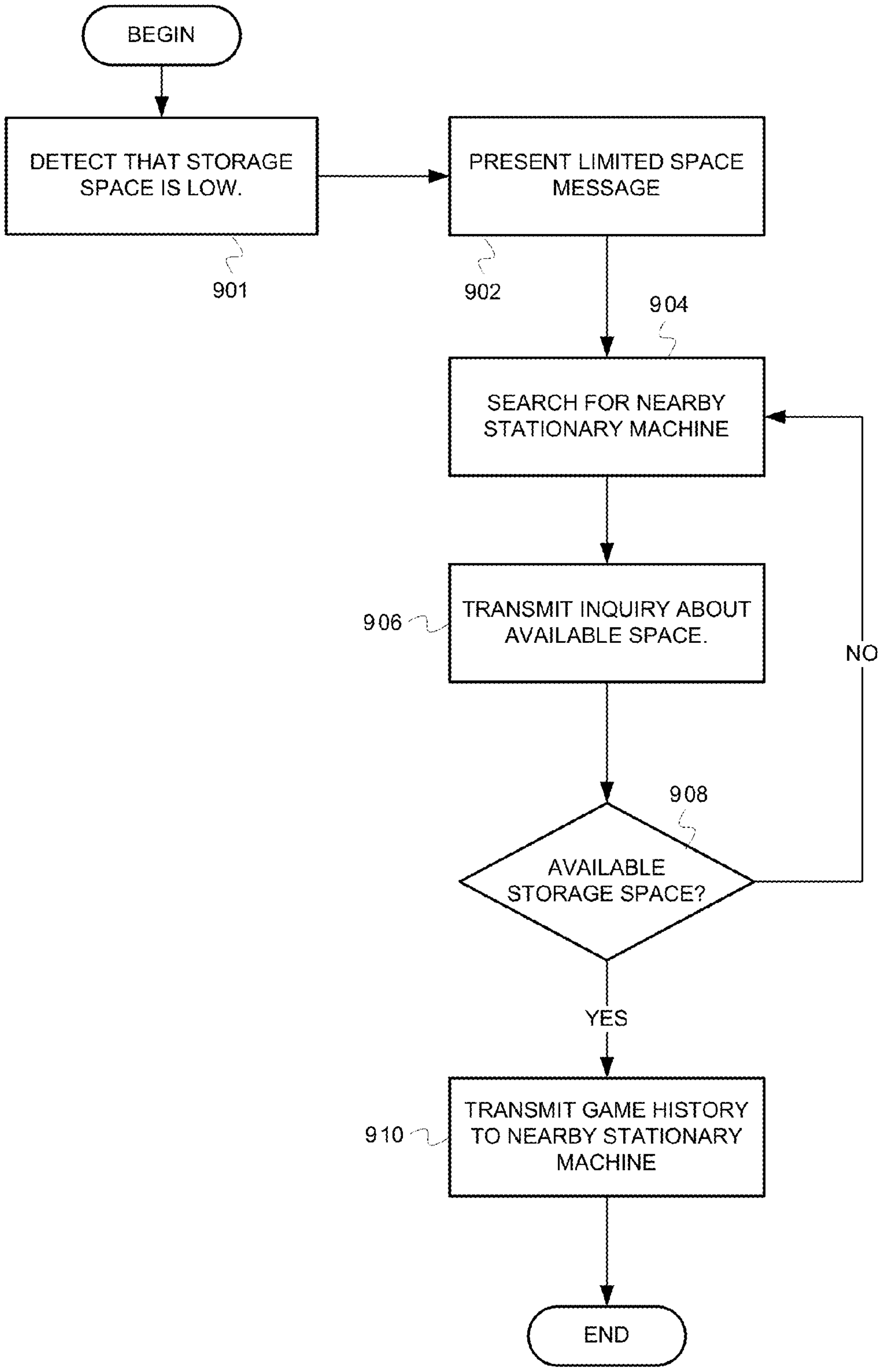
FIG. 9 is a flow diagram illustrating the operations of a mobile machine storing game history on wagering game network devices, according to some embodiments of the invention.
Figure 10:
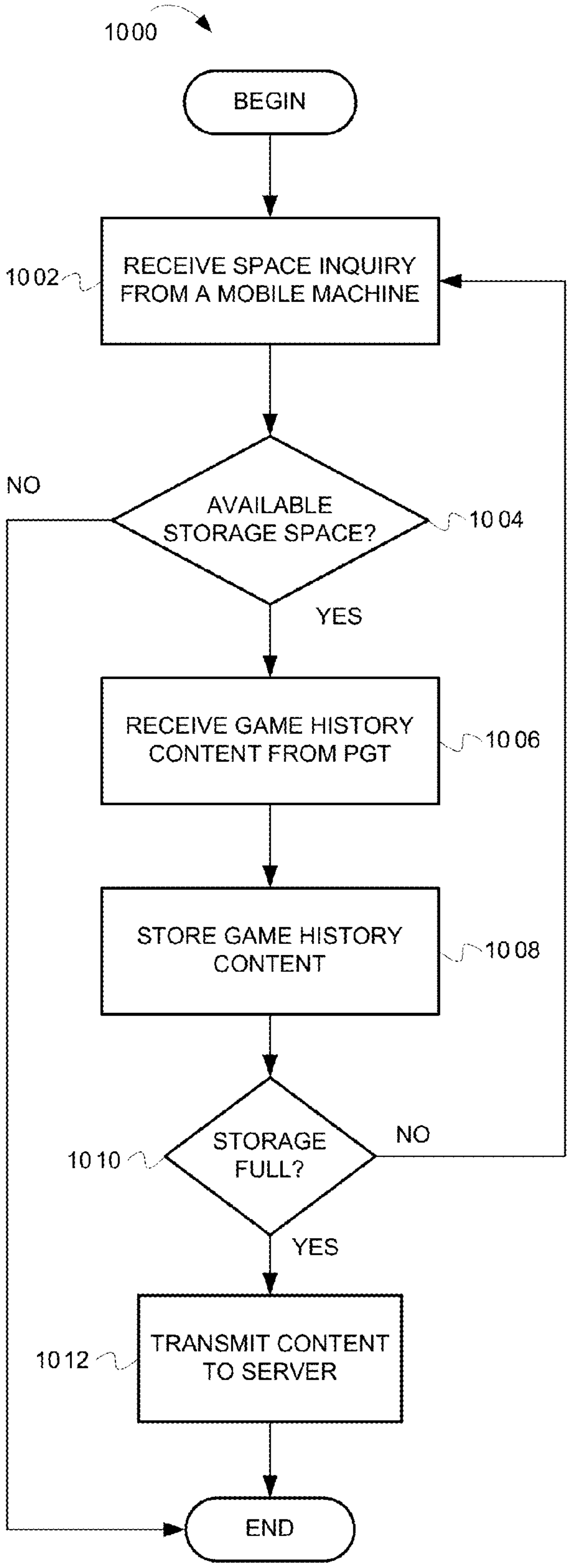
FIG. 10 is a flow diagram illustrating operations for storing game history for wagering game network devices, according to example embodiments of the invention.

FIG. 9 is a flow diagram illustrating the operations of a mobile machine storing game history on wagering game network devices, according to some embodiments of the invention. The flow 900 begins at block 901.

At block 901, a mobile machine's game history unit 336 detects a shortage of storage space in which to store game history. For example, the game history unit 336 may determine that the storage unit 330 is low on space allocated for storing game history. The flow continues at block 902.

At block 902, the mobile machine's primary display 310 presents a message indicating that there a limited amount of space available for storage. In some embodiments, the mobile machine's primary display 310 can present a message indicating various functionality deficiencies, including limited battery power, limited processing capabilities, etc. In other embodiments, the mobile machine's primary display 310 can instruct a player to proceed to the vicinity of a stationary machine with available storage space. The flow continues at block 904.

At block 904, the mobile machine 814 searches for stationary machines that are within its vicinity. In some embodiments, the game history unit 336 can wirelessly search (e.g., by sending Bluetooth or other wireless signals via the external system interface 324) for devices in communication range. If plugged into the docking station 816, the mobile machine's location unit 331 can search for stationary machines 806 & 810 and other devices via the wired communications link 808. The flow continues at block 906.

At block 906, the mobile machine 814 transmits an inquiry about available storage space to one or more stationary machines. The flow continues at block 908.

At block 908, the mobile machine 814 determines whether the queried stationary machine(s) has available storage space. In some embodiments, the game history unit 336 will transmit, to the stationary machine, a message containing information about the amount of storage needed. The game history unit 336 can subsequently receive a message indicating the amount of storage space available in the stationary machine. If the available storage space in the stationary machine is less than the space required to store the mobile machine's game history, the flow will continue at block 904. Otherwise, the flow continues at block 910.

At block 910, the mobile machine's game history unit 336 transmits game history to the stationary machine 806. From block 910, the flow ends.

Although FIG. 9 describes operations of a mobile machine transmitting game history to a stationary machine, other embodiments can provide for different transmission destinations for such content. For example, a mobile machine can transmit game history, or any stored content, to various wagering game devices with available storage space, including a wagering game server, another mobile machine, etc. In some embodiments, a game server can facilitate the transmission of game history, or any stored content, to another wagering game device. This subsection continues with a description of the stationary machine's role in sharing storage space.

FIG. 10 is a flow diagram illustrating operations for storing game history for wagering game network devices, according to example embodiments of the invention. The flow 1000 begins at block 1002.

At block 1002, a stationary machine receives a space inquiry from the mobile machine 814. The flow continues at block 1004.

At block 1004, the stationary machine determines whether it has available storage space. In some embodiments, the stationary machine's storage unit 330 can indicate the amount of storage space available on the device. The stationary machine can compare its available storage space in storage unit 330 with the storage space needed for the mobile machine's game history. In some embodiments, the stationary machine notifies the mobile machine whether it has available space. If the stationary machine has available storage space, the flow continues at block 1006. Otherwise, from block 1004, the flow ends.

At block 1006, the stationary machine 806 receives game history from the mobile machine 810. The stationary machine can receive the game history from the mobile machine via a wireless communications link, such as Bluetooth, 802.11, etc. Stationary machines can also receive game history over wired links, such as from a docked mobile machine. The flow continues at block 1008.

At block 1008, stationary machine 806 stores the game history content. In some embodiments, the stationary machine stores the game history in its storage unit 330. The stored game history can subsequently be returned to the mobile machine upon request by the mobile machine or other network devices. The flow continues at block 1010.

At block 1010, the stationary machine determines whether its storage unit 330 has reached capacity. If storage unit 330 has not reached its capacity, the flow will continue at block 1002. If storage space has reached capacity, the flow continues at block 1012.

At block 1012, stationary machine 806 transmits stored game history to a wagering game server 802, freeing storage space for more resource sharing. From block 1012, the flow ends.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for utilizing, in a wagering game machine, video processing resources of a remote wagering game machine, the method comprising:

detecting, by the wagering game machine, low processing capabilities of the wagering game machine;

determining, in response to the detecting low processing capabilities, that remote resources are needed for processing video content associated with a wagering game;

requesting, via a network, the remote resources from the remote wagering game machine;

receiving, from the remote wagering game machine via the network, processed video content for the wagering game; and presenting, on a display device, the wagering game using the processed video content.

2. The method of claim 1, wherein the processed video content is suitable for presentation on a display device of the wagering game machine.

3. The method of claim 1, wherein the determining that remote resources are needed is based on the video content requiring scaling to be suitable for display on a display device of the wagering game machine.

4. The method of claim 1 further comprising:

receiving, from a wagering game server, a result for the wagering game.

5. The method of claim 1 further comprising:

determining a result for the wagering game.

6. One or more non-transitory machine-readable storage devices including instructions that when executed by one or more processors of a first wagering game machine, cause the one or more processors to perform operations for processing game history information, the instructions comprising:

instructions for presenting a wagering game on the first wagering game machine;

instructions for generating the game history information for use in replaying the wagering game, wherein the game history information includes a result of the wagering game;

instructions for detecting a shortage of storage space in the storage device;

instructions for searching for a second wagering game machine having available storage space;

instructions for transmitting the game history information to the second wagering game machine; and instructions for deleting the game history information from the storage device.

7. The one or more non-transitory machine-readable storage devices of claim 6, further comprising:

instructions for receiving the game history information from the second wagering game machine;

instructions for replaying, on the first wagering game machine, the wagering game based on the game history information.

8. The one or more non-transitory machine-readable storage devices of claim 6, wherein the instructions for searching include instructions for transmitting a request for storage space over a network.

9. The one or more non-transitory machine-readable storage devices of claim 6, wherein the second wagering game wagering game machine is a stationary wagering game machine, and wherein the first wagering game machine is a mobile wagering game machine.

10. The one or more non-transitory machine-readable storage devices of claim 6, wherein the result of the wagering game is determined by a remote wagering game server.

11. The one or more non-transitory machine-readable storage devices of claim 6, wherein the game history information is transmitted via low power wireless signals.

12. A system comprising:

a first wagering game machine including a display device, the first wagering game machine configured to request, from a second wagering game machine, processed video content formatted for the display device;

present a wagering game using video content;

the second wagering game machine configured to receive, from the first wagering game machine, the request for processed video content formatted for the display device;

process video content into the processed video content formatted for the display device; and transmit the processed video content to the first wagering game machine.

13. The system of claim 12, wherein the first wagering game machine is further configured to generate game history information associated with the wagering games; and determine that storage capacity is low;

transmit, after the determination that storage capacity is low, the game history information for storage on second wagering game machine.

14. The system of claim 12, wherein the second wagering game machine is configured to process the video content by scaling the video content to fit the video device.

15. The system of claim 12, wherein the game history information indicates player inputs and results associated with the wagering game.

16. The system of claim 12, wherein the first wagering game machine is a mobile wagering game machine, and wherein the second wagering game machine is a stationary wagering game machine.

17. The system of claim 12, wherein the first wagering game machine is further configured to receive the game history information from the second wagering game machine, and to present, on the display device, a replay of the wagering game based on the game history information.

18. A wagering game machine comprising:

one or more processors;

one or more machine readable storage devices including computer executable program code executable by at least one of the one or more of the processors, the computer executable program configured to perform operations including detecting low processing capabilities of the wagering game machine;

determining, by the wagering game machine, that remote resources are needed for processing video content associated with a wagering game;

requesting, via a network, the remote resources from a remote wagering game machine;

receiving, from the remote wagering game machine via the network, processed video content for the wagering game; and presenting, on a display device, the wagering game using the processed video content.

19. The wagering game machine of claim 18, wherein the processed video content is scaled for a display device of the wagering game machine.

20. The wagering game machine of claim 18, wherein the operations further include determining the video content has to be scaled for the display device.

* * * * *